US011034241B2

(12) United States Patent
Wiedemann et al.

(10) Patent No.: US 11,034,241 B2
(45) Date of Patent: Jun. 15, 2021

(54) CENTER CONSOLE AND ELECTRONIC OPERATING SYSTEM FOR A VEHICLE

(71) Applicant: Bayerische Motoren Werke Aktiengesellschaft, Munich (DE)

(72) Inventors: Daniel Wiedemann, Wolfratshausen (DE); Gabriel Hairer, Munich (DE); Tobias Schoellermann, Prien am Chiemsee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 326 days.

(21) Appl. No.: 16/221,775

(22) Filed: Dec. 17, 2018

(65) Prior Publication Data
US 2019/0118652 A1 Apr. 25, 2019

Related U.S. Application Data

(63) Continuation of application No. PCT/EP2017/063165, filed on May 31, 2017.

(30) Foreign Application Priority Data

Jun. 29, 2016 (DE) ...................... 10 2016 211 674.6

(51) Int. Cl.
*B60K 37/02* (2006.01)
*B60R 13/02* (2006.01)
(Continued)

(52) U.S. Cl.
CPC .............. *B60K 37/02* (2013.01); *B60K 35/00* (2013.01); *B60K 37/04* (2013.01); *B60K 37/06* (2013.01);
(Continued)

(58) Field of Classification Search
CPC ........ B60K 37/02; B60K 37/04; B60K 37/06; B60K 35/00; H04W 4/80; B60R 13/0262; H04B 1/082; H04B 1/3888
(Continued)

(56) References Cited

U.S. PATENT DOCUMENTS 6,958,675 B2   10/2005  Maeda et al.
9,612,797 B2 *  4/2017  Cuddihy .............. H04B 5/0056
(Continued)

FOREIGN PATENT DOCUMENTS

DE            103 19 674 A1   11/2004
DE     10 2010 003 888 A1    10/2011
(Continued)

OTHER PUBLICATIONS

International Search Report (PCT/ISA/210) issued in PCT Application No. PCT/EP2017/063165 dated Aug. 16, 2017 with English translation (six (6) pages).
(Continued)

*Primary Examiner* — Peter D Nolan
*Assistant Examiner* — Luke Huynh
(74) *Attorney, Agent, or Firm* — Crowell & Moring LLP

(57) ABSTRACT

A vehicle has a driver's position, a passenger position and a center console which is arranged between the driver's position and the passenger position. The center console includes an antenna which is designed to establish a wireless, radio-based near-field communication link.

8 Claims, 3 Drawing Sheets

(51) Int. Cl.
*H04B 1/08* (2006.01)
*H04B 1/3888* (2015.01)
*B60K 37/04* (2006.01)
*B60K 37/06* (2006.01)
*H04W 4/80* (2018.01)
*B60K 35/00* (2006.01)
*B60R 11/00* (2006.01)
*H04M 1/72412* (2021.01)

(52) U.S. Cl.
CPC ......... *B60R 13/0262* (2013.01); *H04B 1/082* (2013.01); *H04B 1/3888* (2013.01); *H04W 4/80* (2018.02); *B60K 2370/126* (2019.05); *B60K 2370/143* (2019.05); *B60K 2370/145* (2019.05); *B60K 2370/152* (2019.05); *B60K 2370/55* (2019.05); *B60K 2370/589* (2019.05); *B60K 2370/774* (2019.05); *B60R 2011/0007* (2013.01); *B60R 2011/0075* (2013.01); *B60R 2013/0287* (2013.01); *H04M 1/72412* (2021.01); *H04M 2250/04* (2013.01)

(58) Field of Classification Search
USPC .......................................................... 701/36
See application file for complete search history.

(56) References Cited

U.S. PATENT DOCUMENTS

| | | |
|---|---|---|
| 2006/0041373 A1 | 2/2006 | Rowe |
| 2011/0237186 A1* | 9/2011 | Preissinger ........... B60R 16/037 455/41.1 |
| 2012/0050028 A1* | 3/2012 | Mastronardi .......... B60K 37/00 340/441 |
| 2013/0210349 A1 | 8/2013 | Ganz |
| 2014/0172192 A1 | 6/2014 | Kato |
| 2014/0309864 A1* | 10/2014 | Ricci ........................ A61B 7/04 701/36 |
| 2015/0109103 A1 | 4/2015 | Shimura et al. |
| 2017/0331936 A1* | 11/2017 | Juzswik ............... H04B 1/3877 |

FOREIGN PATENT DOCUMENTS

| | | |
|---|---|---|
| DE | 20 2011 105 521 U1 | 1/2012 |
| DE | 10 2011 078 018 A1 | 12/2012 |
| DE | 10 2012 214 458 A1 | 2/2013 |
| DE | 10 2013 203 641 A1 | 9/2013 |
| DE | 10 2013 006 086 A1 | 1/2014 |
| JP | 2013-216227 A | 10/2013 |
| JP | 2014-88092 A | 5/2014 |
| WO | WO 2008/138492 A1 | 11/2008 |

OTHER PUBLICATIONS

German-language Written Opinion (PCT/ISA/237) issued in PCT Application No. PCT/EP2017/063165 dated Aug. 16, 2017 (five (5) pages).
German-language Search Report issued in counterpart German Application No. 102016211674.6 dated May 15, 2017 with partial English translation (12 pages).

* cited by examiner

CENTER CONSOLE AND ELECTRONIC OPERATING SYSTEM FOR A VEHICLE

CROSS REFERENCE TO RELATED APPLICATIONS

This application is a continuation of PCT International Application No. PCT/EP2017/063165, filed May 31, 2017, which claims priority under 35 U.S.C. § 119 from German Patent Application No. 10 2016 211 674.6, filed Jun. 29, 2016, the entire disclosures of which are herein expressly incorporated by reference.

BACKGROUND AND SUMMARY OF THE INVENTION

The invention relates to a vehicle having a center console and an electronic operator control system. The invention relates, in particular, to a vehicle in which the operator control system is at least partially integrated in the center console. The invention also relates to a corresponding center console and to a corresponding operator control system.

Operator control systems which have an operator control element integrated into the center console are known for the purpose of operating electronic control components in a vehicle, wherein the vehicle has at least a driver area, a front-seat passenger area and also a center console arranged between these two areas, in particular in a motor vehicle such as a passenger car or a van. An operator control element of this kind can be, for example, an electromechanical rotary and/or pushbutton actuator by which electrical signals are sent to a component of a graphical user interface, such as to a screen which is integrated in the vehicle for example, when said rotary and/or pushbutton actuator is turned and, respectively, pushed. As a result, for example, menu areas which are displayed on the screen, and therefore vehicle functions of the vehicle which are associated with said menu areas, can be selected.

WO 2008/138492 A1 discloses a corresponding rotary and pushbutton actuator of an operator control device which can additionally be tilted in order to execute further operator control functions, as a result of which, for example, it is possible to navigate to the right or left in a displayed menu.

Control systems in motor vehicles are becoming increasingly complex overall. In addition, corresponding control components, for example for setting the seat position for the driver and/or for setting infotainment systems, are preconfigured in a user-specific manner. As soon as a corresponding vehicle system identifies that a particular person is driving the vehicle and/or operating the system, corresponding setting values can be taken by the system from a preconfigured data memory and be used for controlling one or more control components. DE 10 2013 006 086 A1 has described, for example, executing corresponding identification or authentication of a driver or other user of the vehicle in a manner controlled by eye movement. This document also describes that authentication of different drivers is possible by use of NFC-like authentication mechanisms.

US 2006/0041373 A1 describes a communication system for a vehicle, which communication system includes a system controller to which a mobile telephone can be connected via cables or without cables, for example via a link in line with the Bluetooth communication standard. In the communication system, data can also be loaded by way of a magnetic card reader or an intelligent key in order to set, for example, the seat position for the driver.

By way of example, a data set containing corresponding key data can be stored in a mobile telephone for the purpose of providing the function of an intelligent key. To this end, DE 10 2011 078 018 A1 describes transmitting appropriate authorization data to a control system, in order to unlock a locked vehicle, using a mobile telephone by means of the wireless, radio-based transmission standard Near-Field Communication (NFC). To this end, the telephone is held against a corresponding computer unit which is equipped with antennas.

The content of the abovementioned publications is hereby expressly incorporated in by reference herein.

The object of the invention is to provide a way by which data for setting a control system in a vehicle in a user-specific manner can be loaded into the control system in a simple manner.

According to the invention, a driver area, a front-seat passenger area and a center console, which is arranged between the driver area and the front-seat passenger area, are provided in a vehicle. The center console comprises an antenna which is designed for establishing a wireless, radio-based near-field communication link.

The invention is based on the insight that, for the purpose of transmitting data to a controller of the vehicle via a near-field communication link from a mobile device, which is independent of the vehicle and/or is not permanently installed in said vehicle, such as a smartphone for example, it is advantageous to position the corresponding antenna of the reading device of the vehicle such that both the driver and also the front-seat passenger can move the device into the vicinity of the antenna in an ergonomic and convenient manner. The invention is also based on the insight that it is advantageous to be able to place and/or store the mobile device at a sufficient proximity to the antenna in a relatively easy manner in order to read the data. Furthermore, it has been identified that the center console can advantageously be used for this purpose and the antenna, and also corresponding cabling and possibly a signal amplifier and/or a signal processor, can be easily accommodated.

According to one advantageous exemplary embodiment of the invention, the center console comprises at least one operator control element of an electronic operator control system for a controller of the vehicle.

The operator control element is advantageously arranged centrally, in particular in such a way that it can be operated both by the driver and also by the front-seat passenger of the vehicle from their respective area while seated. The operator control element is preferably integrated into the center console. The operator control element can be integrated, for example, in a cutout in the center console by way of a mechanical frame. In this case, means which prevent the mobile device from slipping on the spacer element or on the center console can also be provided. For example, the surface of the spacer element can be of low-slip design, in particular by use of a coating which has a relatively high coefficient of friction, such as a rubber coating for example. The spacer element can also have means for temporary mechanical fixing, for example a recess, a holder or a stop in or on which the device is entirely or partially temporarily inserted or placed.

In a manner benefiting from the central position of the vehicle-side antenna between the driver area and the front-seat passenger area, the invention can advantageously have the effect that both the driver and also the front-seat passenger are able to insert a mobile device which they are carrying and which is capable of near-field communication, such as a smartphone for example, into the near-field reading region of the vehicle-side antenna in a simple and ergonomically expedient manner, and in this way couple said mobile device to a vehicle-side controller for data transmission.

Owing to the central position, it is not necessary, in particular, for the front-seat passenger to reach into the region of the driver area for the purpose of coupling the mobile device. This can prevent the driver from being disturbed while driving during the course of the coupling process.

In the present case, a wireless near-field communication link is understood to mean a wireless, radio- and antenna-based communication link which, on account of its technical circumstances, is limited to a distance between the respective transmitting antenna and receiving antenna of less than one or a few centimeters. The distance can be limited, in particular, to at most 15 centimeters, at most 10 centimeters, at most 5 centimeters, at most 2 centimeters, at most one centimeter or at most half a centimeter. Outside the respective limited region, communication is no longer possible without interference and, in particular, is no longer possible at all.

A near-field communication link within the meaning of the present invention can have, for example, features of the so-called Near-Field Communication (NFC) standard. This transmission standard for contactless interchange of data by radio technology over short distances of a few centimeters is based, for example, on so-called Radio Frequency Identification (RFID) technology. An RFID system typically consists of a transponder which has an antenna, is located, for example, on a mobile unit, such as a smartphone, and contains an identifying code, and also a reading device, which has an antenna, for reading said identifier. In this case, it can also be provided that data are transmitted in a bidirectional manner between two devices which are RFID compatible, wherein the two devices can alternately assume the role of the transponder or data transmitter and of the reading device or data receiver. Data can also be interchanged between any desired memory of the mobile unit and an NFC reading device by means of an NFC link.

According to one advantageous exemplary embodiment of the invention, the antenna is integrated into the operator control system. This renders possible particularly user-friendly operation when transmitting data from a mobile device to the respective controller of the vehicle since, for this purpose, the device only has to be held against the operator control system by the user. The operator control system is very readily identifiable as such by the user. In addition, the user can then perform additional operator control steps relatively easily because his hand is already on the operator control system.

A variety of antenna shapes are possible within the scope of the invention. In particular, a round shape, a rectangular shape or a square shape are possible for the respective antenna. As a result, for example, a circular antenna can be relatively easily accommodated in a round operator control element of the center console. In addition, a high reception strength can be achieved by virtue of the antenna being matched to the outer contour of the operator control element in such a way that said antenna runs on the edge of said outer contour.

In another exemplary embodiment of the invention, the center console has at least one decorative element which does not have an operator control function, and the antenna is provided away from the decorative element. A decorative element is, in particular, an element which has a scratch-prone surface, for example polished wood or an element which is coated with a high-gloss lacquer. When the antenna is provided in a region of the center console in which there is no decorative element, damage and/or soiling of decorative elements, in particular scratches, can be avoided because a mobile device for transmitting data is not held against the decorative elements. The site at which the antenna is located can be, in particular, suitably marked on the surface of the center console, for example by an antenna symbol.

According to one further exemplary embodiment of the invention, a spacer element is provided in the region of the antenna, which spacer element protrudes in relation to a surface of the decorative element. This can have the effect that an object which is placed onto the spacer element does not touch the surface of the decorative element. As a result, damage to the decorative element can likewise be avoided when a mobile device is moved into the vicinity of the antenna for the purpose of data transmission. The height of the raised portion of the spacer element in relation to the surface of the decorative element can be matched, in particular, to the respective circumstances of the maximum range of the radio transmission distance, so that reliable transmission of data is still possible. The raised portion or the spacer element is accordingly at most a few centimeters high and, in particular, less than one centimeter. The spacer element can be designed, in particular, such that the mobile device can be entirely or partially placed on said spacer element, for example by virtue of forming a support area. The support area can be designed as a continuous surface or have surface sections which are separated from one another. The spacer element then also acts as a support element and, to this end, can be in the form of a continuous or interrupted frame for example. The support area can be designed in particular such that it is substantially parallel to an antenna which is integrated into the center console from the vehicle side. As a result, optimum coupling of the signals which are transmitted between the antennas of the mobile device and of the vehicle can be achieved when the mobile device is placed flat onto the support area.

According to the invention, a center console for a vehicle can also be specified, which center console comprises an antenna which is designed for establishing a wireless, radio-based near-field communication link.

In one advantageous exemplary embodiment, the center console can have a decorative element which is at least partially conductive. The antenna can then advantageously comprise the conductive parts of the decorative element. As a result, the antenna can form a unit with the decorative element in a virtually invisible manner. To this end, the decorative element can have conductive regions and non-conductive regions and, in particular, alternately conductive regions and nonconductive regions. As a result, in particular, conductor tracks by which the antenna is formed can be formed in the decorative element. This can further advantageously have the effect that the antenna is positioned very close to the surface and therefore relatively little damping of the antenna arrangement can be achieved.

Furthermore, an operator control system which is designed for integration into a center console of a vehicle and which comprises an operator control device and an antenna can be specified according to the invention.

The operator control device can preferably have a rotary and/or pushbutton actuating device and/or a touch-sensitive sensor area. Said operator control device can also have a support element for supporting a mobile device in such a way that the wireless near-field communication link can be established with the antenna which is provided in the operator control system by means of an antenna which is provided in the mobile device. The support element can be formed, for example, by a substantially annular element of the rotary and pushbutton actuating device, which annular element, in particular, encloses the touch-sensitive sensor area and protrudes in relation to said sensor area. The corresponding raised portion of the element, which element may also act as a spacer element, is accordingly at most a few centimeters high and, in particular, lower than one centimeter. The support element can also have shapes other than an annular shape. For example, said support element can be at least substantially rectangular, star-shaped or trapezoidal.

According to one advantageous exemplary embodiment, the operator control system can have an optical display device with which optical signals can be output. The optical display device can be designed, in particular, in order to output graphical information, such as symbols or images for example. Said optical display device can include a Liquid Crystal Display (LCD) and, in particular, a display which has Light-Emitting Diodes (LEDs). The display device can also have input means and be designed, for example, as a so-called touchscreen in which an electrical input signal is generated by touching the screen surface. The display device is then suitable for use as a graphical user interface. The user interface can then be used to operate electronic vehicle components and mechanical vehicle components, which may be operatively connected to said electronic vehicle components, or further components, such as a device which is coupled to the vehicle merely for data transmission purposes for example, for example a smartphone or a garage door drive which is provided on a garage and can be remotely controlled.

The display device can be configured, in particular, such that it is matched to a surface of another vehicle element, in particular to a curved surface and/or in particular to the surface of the center console, of a decorative element and/or of the surface of the rotary/pushbutton actuating device. To this end, the display device can comprise, in particular, organic light-emitting diodes (OLEDs).

The antenna can be integrated into the electronic display device, for example in a frame which surrounds an optoelectronic display element, such as a touchscreen element for example, and in particular encloses said optoelectronic display element.

According to one further advantageous exemplary embodiment of the invention, the operator control device can include an operator control element which is designed as a decorative element of the center console, which decorative element is variable in respect of its surface appearance. Said operator control element can further be designed in such a way that it is indistinguishable or at least barely distinguishable from adjacent decorative elements of the center console, which do not have an operator control function, in at least one operating state, in particular when said operator control element is not actively operated, for example is not pushed. In this operating state, which can be a switched-off operating state or a standby operating state, the operator control element can have the appearance of, for example, a wood surface, corresponding to a wood surface in the adjacent region of the center console. In the switched-on operating state or during operator control of the operator control element, for example when said operator control element has been pushed, the optical and in particular graphical appearance of the surface of said operator control element can then change, for example by means of a light signal or another decorative effect, such as a metallically acting surface for example. An optical feedback signal can be relatively easily output by an operator control element of this kind when the operator has successfully operated, for example pushed, the element.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
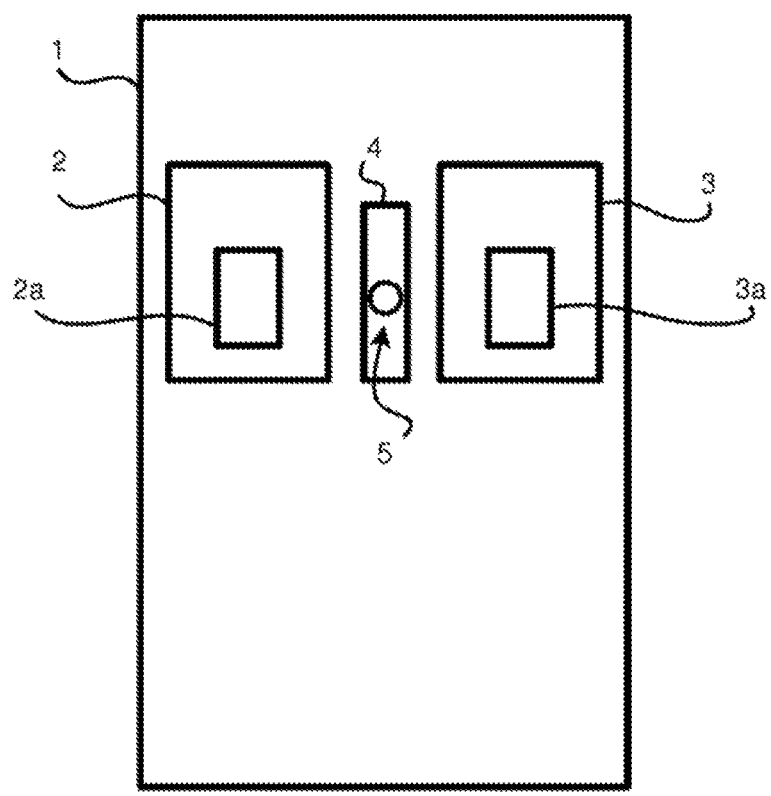
FIG. 1 is a schematic diagram of a vehicle.

In the passenger car 1 illustrated merely schematically in FIG. 1, the driver seat 2a for the vehicle driver is provided in the driver area 2 and the front-seat passenger seat 3a for a front-seat passenger is provided in the front-seat passenger area 3. The driver area 2 and the front-seat passenger area 3 each also have a footwell and, in particular, also a space to the left and to the right of the respective seat. The center console 4 is fitted between the driver area 2 and the front-seat passenger area 3. A round, electromechanical rotary and pushbutton actuator 5 is provided in the center console in turn. Electrical signals to a controller of the passenger car 1 can be generated by way of the rotary and pushbutton actuator 5, which is integrated into the center console 4, both by the driver of the passenger car 1 and also by the front-seat passenger turning and/or pushing said rotary and pushbutton actuator. By way of example, a navigation system of the passenger car 1 or an entertainment system of the passenger car 1 are set or settings are made on another control system of the passenger car 1 by way of the electrical signals.

Figure 2:
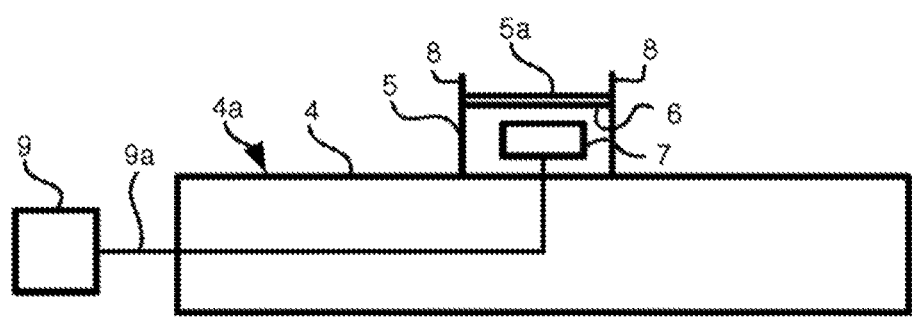
FIG. 2 is a schematic diagram of a center console.

FIG. 2 shows a longitudinal section through the center console 4. The rotary and pushbutton actuator 5 which is integrated into the center console 4 has an electrical circuit 7 with which turning and pushing movements of the rotary and pushbutton actuator 5 are converted into corresponding electrical signals. The rotary and pushbutton actuator 5 illustrated here can exhibit, in particular, further details of the operator control device which are described in abovementioned document WO 2008/138492 A1, for example elements and/or properties of the cap element described there and/or a tilting function which can be used for navigating along a corresponding tilting direction in menus. In addition, for example, the center console 4 described here can have an enclosure, described in the prior publication, for the rotary and pushbutton actuator 5 and/or further keys and/or switches for operator control functions. To this end, reference is hereby once again made to the entire contents of said publication.

The electrical circuit 7 is connected to at least one further control system 9 of the passenger car 1 by way of a corresponding electrical connection 9a. The connection 9a can be, for example, a suitable data bus, such as a Controller Area Network (CAN) bus, a Local Interconnect Network (LIN) bus and/or a Media Oriented Systems Transport (MOST) bus, for example.

On that side of the rotary and pushbutton actuator 5 facing away from the console surface 4a, the rotary and pushbutton actuator has a sensor area 5a, a so-called operator control touchpanel, which is touch-sensitive and by which the driver and/or front-seat passenger, for example using one of their fingers, can likewise input operator control commands.

An annular spacer element 8, which encloses the sensor area 5a, extends further upward at the outer edge of the round operator control touchpanel 5a. The spacer element 8 preferably has a height of at most one or a few millimeters (for example 2 millimeters, 5 millimeters or 10 millimeters) in relation to the operator control touchpanel 5a, so that the operator control of the rotary and pushbutton actuator 5 by hand is moreover possible in an ergonomic and convenient manner. An antenna 6 is integrated into the round rotary and pushbutton actuator 5 just below, for example at most 0.5 cm, at most 1 cm, at most 5 cm or at most 10 cm below, the operator control touchpanel 5a. The antenna 6 is round, in a manner matched to the shape of the rotary and pushbutton actuator 5. The antenna is designed for a near-field communication link (NFC). The antenna 6 can be connected to a signal amplifier, a signal decoder and/or to the electrical circuit 7. In this case, the circuit 7 can have, in particular, signal-amplifying and/or signal-decoding functions.

Figure 3:
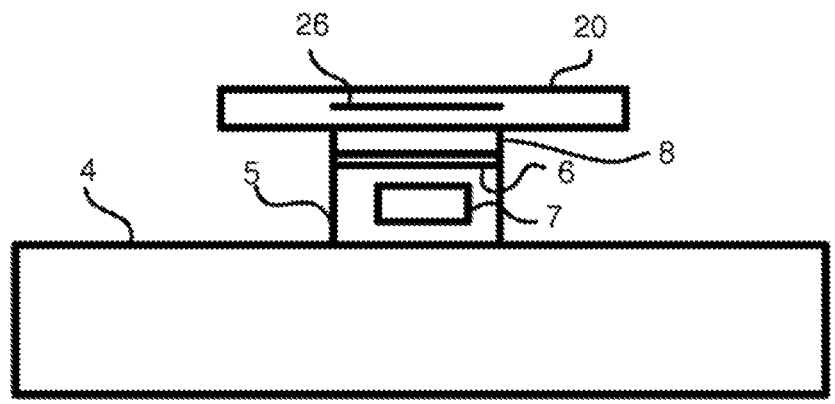
FIG. 3 is a schematic diagram of a smartphone which is placed onto the center console.

FIG. 3 shows how a smartphone 20, which for its part has an antenna 26 which is designed for a near-field communication link (NFC), is placed flat on the spacer element 8 of the rotary and pushbutton actuator 5. The antenna 26 of the smartphone 20 is parallel to the antenna 6 of the passenger car 1 here. A near-field communication link can be established between the antennas 6, 26, so that data can be transmitted between control components of the smartphone 20 and control components of the passenger car 1.

The smartphone 20 can be carried, for example, by one of the vehicle users and can be held in the region of the antenna 6 on the center console 4 or, as shown in FIG. 3, conveniently placed on the rotary and pushbutton actuator 5, on the annular spacer element 8 thereof, for the purposes of coupling and data transmission.

Figure 4:
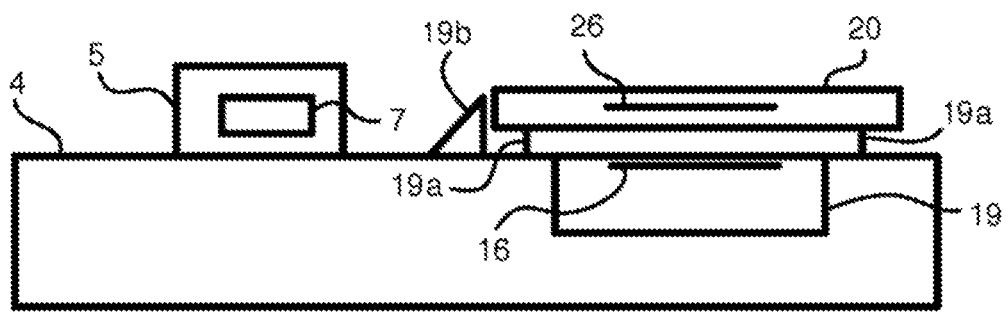
FIG. 4 is a schematic diagram of a further center console.

FIG. 4 shows an exemplary embodiment in which an antenna 16 is integrated in the region of a decorative element 19 in the center console 4, which decorative element is provided with a scratch-prone high-gloss lacquer on its surface. In order to avoid scratching of the surface, the center console 4 has an annular spacer element 19a in the region of the decorative element 19, which annular spacer element protrudes upward in relation to the surface of the decorative element 19. When the smartphone 20 is placed flat onto the spacer element 19a, a near-field communication link can in turn be established between the antennas 6, 26. In order to prevent the smartphone 20 from slipping, in particular when the smartphone 20 is still also left on the center console for a certain time after pairing and transmission of personalization data and the passenger car 1 is set in motion, a stop 19b is additionally provided on the center console 4 in the exemplary embodiment shown here. For the same purpose, the spacer element 19b can also be provided with a slip-resistant coat.

For the purpose of establishing a near-field communication link, a touch sensor can be provided in the passenger car 1, which touch sensor detects whether an object, in particular a smartphone 20 with a corresponding NFC antenna 26, is in contact with a spacer element 8, 19a which is spatially associated with the vehicle-side NFC antenna 16. If contact is determined, a controller can preferably be activated on the vehicle side for the purpose of establishing the near-field communication link which is otherwise in an energy-saving idle mode.

Figure 5:
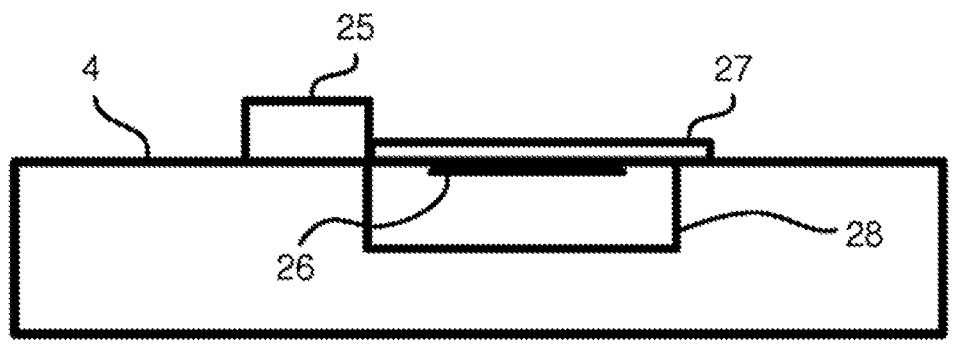
FIG. 5 is a schematic diagram of an operator control system comprising a display.

In the arrangement shown in FIG. 5, a rotary/pushbutton actuator 25 is again provided on the center console 4. In addition to the rotary/pushbutton actuator 25, an optical display device 27, which is in the form of an OLED display, is provided on the surface of the center console 4, it being possible for graphical displays for operator control of the vehicle or other information, for example from an infotainment system relating to radio broadcasters, music titles, weather data, news, etc., to be output to the driver of the vehicle by means of said optical display device. In this exemplary embodiment, the NFC antenna 26 is arranged below the display 27 in the center console 4.

The OLED display can act, in particular, as a decorative element 28 of the center console 4 and its optical appearance can resemble the adjacent regions of the center console. The OLED display can also be configured as a touchscreen and its appearance can be adapted depending on the operating state of the touchscreen, so that the OLED display cannot be distinguished from the other regions of the center console in the switched-off state and/or in a standby state and can be distinguished in a display state, for example in which the OLED display outputs a graphical symbol of an operator control button and/or at least one other item of optical information.

Figure 6:
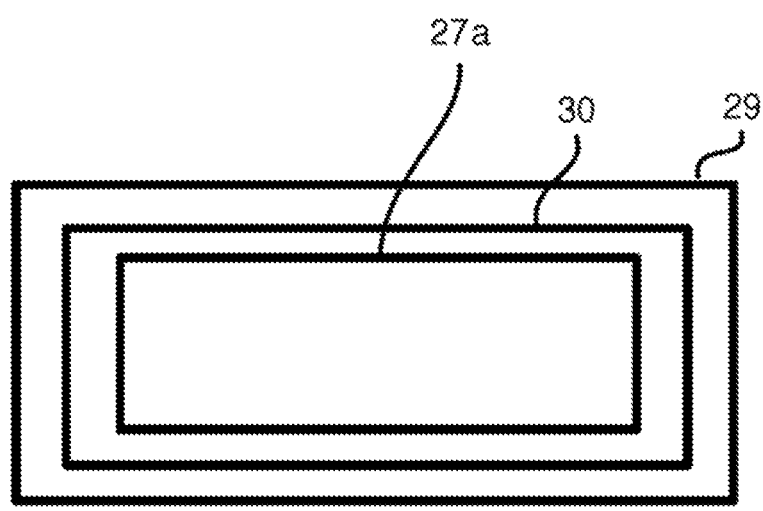
FIG. 6 is a schematic diagram of a display with a frame.

In the exemplary embodiment shown in FIG. 6, an optical display device is provided in which an optical display 27a, for example an OLED display, is enclosed by a mechanical frame 29 in which the NFC antenna 30 is integrated for its part. In a further exemplary embodiment which is modified in relation to the above, the frame 29 can be raised in relation to the surface of the display 27a in such a way that the frame acts as a spacer element and, as already described further above with respect to corresponding frames, contact with the display 27a is avoided when a smartphone is placed onto the frame 29.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system, comprising:
   an operator control system designed to be integrated into a center console of a vehicle;
   an operator control device of the operator control system; and
   an antenna designed to establish a wireless, radio-based near-field communication link, wherein
   the center console comprises the antenna and the operator control device,
   the operator control device comprises a rotary and/or pushbutton actuating device and/or a touch-sensitive sensor area,
   the operator control device comprises a support element for supporting a mobile device such that the wireless near-field communication link is establishable with the antenna which is provided in the operator control system by way of an antenna provided in the mobile device, and the support element is an element of the rotary and/or pushbutton actuating device which encloses the touch-sensitive sensor area and protrudes in relation to said sensor area.

2. The system as claimed in claim 1, further comprising an optical display device.

3. The system as claimed in claim 1, wherein the operator control device comprises an operator control element which is designed as a decorative element of the center console, which decorative element is variable in respect of its surface appearance.

4. A system, comprising:
an operator control system designed to be integrated into a center console of a vehicle;
an operator control device of the operator control system; and
an antenna designed to establish a wireless, radio-based near-field communication link; and
an optical display device, wherein
the center console comprises the antenna and the operator control device,
the optical display device comprises a mechanical frame, and
the frame comprises the antenna.

5. The system as claimed in claim 4, wherein
the operator control device comprises a rotary and/or pushbutton actuating device and/or a touch-sensitive sensor area.

6. The system as claimed in claim 4, wherein
the operator control device comprises a support element for supporting a mobile device such that the wireless near-field communication link is establishable with the antenna which is provided in the operator control system by way of an antenna provided in the mobile device.

7. The system as claimed in claim 6, wherein
the support element is an element of the rotary and/or pushbutton actuating device which encloses the touch-sensitive sensor area and protrudes in relation to said sensor area.

8. The system as claimed in claim 4, wherein
the optical display device comprises organic light-emitting diodes.

* * * * *